US008042035B2

(12) United States Patent
Pamu et al.

(10) Patent No.: US 8,042,035 B2
(45) Date of Patent: Oct. 18, 2011

(54) METHOD AND SYSTEM FOR RAPID ACCESS TO FREQUENTLY USED OR SEARCHED OBJECTS

(75) Inventors: Gautham Pamu, Round Rock, TX (US); Richard W. Ragan, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/852,654

(22) Filed: Sep. 10, 2007

(65) Prior Publication Data

US 2009/0070685 A1    Mar. 12, 2009

(51) Int. Cl.
*G06F 17/00* (2006.01)

(52) U.S. Cl. ........................... 715/206; 715/745

(58) Field of Classification Search .................. 715/745, 715/206
See application file for complete search history.

(56) References Cited

U.S. PATENT DOCUMENTS

| | | | | |
|---|---|---|---|---|
| 5,396,264 | A * | 3/1995 | Falcone et al. | 715/811 |
| 5,801,699 | A | 9/1998 | Hocker et al. | |
| 5,802,516 | A * | 9/1998 | Shwarts et al. | 1/1 |
| 6,078,323 | A | 6/2000 | Gest | |
| 6,184,886 | B1 * | 2/2001 | Bates et al. | 715/760 |
| 6,219,679 | B1 * | 4/2001 | Brisebois et al. | 715/206 |
| 6,643,651 | B1 * | 11/2003 | Pearsall | 1/1 |
| 6,801,916 | B2 * | 10/2004 | Roberge et al. | 1/1 |
| 6,883,143 | B2 | 4/2005 | Driskell | |
| 7,251,584 | B1 * | 7/2007 | Perazolo et al. | 702/183 |
| 7,346,855 | B2 * | 3/2008 | Hellyar et al. | 715/783 |
| 7,827,157 | B2 * | 11/2010 | Shilo et al. | 707/695 |
| 2005/0262052 | A1 * | 11/2005 | Daniels et al. | 707/3 |
| 2009/0327960 | A1 * | 12/2009 | Dernis | 715/823 |

OTHER PUBLICATIONS

"The Complete Idiot's Guide to Windows 98", by Paul McFedries, published by Que in 1998, pp. c, i, ii, 64.*
Kobayashi, M., et al, "Information Retrieval on the Web", ACM Computing Surveys, vol. 32, No. 2, Jun. 2000, pp. 145-173.
Zhang, J. et al., "Evaluation and Evolution of a Browse and Search Interface: Relation Browser++", pp. 179-188, 2004.
Rus, D. et al., "Customizing Information Capture and Access", ACM Transactions on Information Systems, vol. 15, No. 1, Jan. 1997, pp. 67-101.

* cited by examiner

*Primary Examiner* — William L Bashore
*Assistant Examiner* — Gregory A Distefano
(74) *Attorney, Agent, or Firm* — Anna Linne; Roberts Mlotkowski Safran & Cole, P.C.

(57) ABSTRACT

A method and system to rapidly access frequently used objects and/or items is provided. More particularly, the method and system is designed to rapidly access frequently used or search objects and/or items using a placeholders (e.g., Memory Indicators) in a graphical user interface. a method of retrieving items is provided. The method includes detecting one or more selected items from a list of items; creating placeholders representing each of the selected one or more items in a graphical user interface; and continuously updating the placeholders in the graphical user interface upon detecting of newly selected items in the list of items. The placeholders are configured to eliminate subsequent searches for the one or more items in the list.

27 Claims, 8 Drawing Sheets

Search for Customer

Name
Sophia a

Policy has been in effect since:
1995

Injuries
No

Accident date and time
09:24amCT, May 20, 2005

Membership Card Number
22797-14388687

Coupon
No

Mother's maiden name

Location:

520

Search  510

515

Search Results

| Name | Telephone | Last 4 SSN |
|---|---|---|
| Sophie Anderson | 1 555 123-4567 | 2278 |
| Sophie Baker | 1 555 123-4567 | 6789 |
| Sophie Dexter | 1 555 123-4567 | 9567 |
| Sophie Franks | 1 555 123-4567 | 4432 |
| Sophie Jones | 1 555 123-4567 | 7799 |
| Sophie Landry | 1 555 123-4567 | 2391 |
| Sophie Moore | 1 555 123-4567 | 0082 |

Showing 7 of 24 results | Next

FIG. 5e

METHOD AND SYSTEM FOR RAPID ACCESS TO FREQUENTLY USED OR SEARCHED OBJECTS

FIELD OF THE INVENTION

The invention generally relates to a method and system to rapidly access frequently used objects and/or items. More particularly, to a method and system is designed to rapidly access frequently used or searched objects and/or items using placeholders (e.g., Memory Indicators) in a graphical user interface.

BACKGROUND OF THE INVENTION

Applications that work with hundreds of thousands if not millions of objects present unique challenges to users who must locate one specific object within the list. The task of finding the one specific object is often a tedious process. In fact, if the same object is constantly being used, but has to be found each and every time it is used, the process of finding the object actually becomes frustrating and burdensome to the user. As a result of having to find the object, a lot of time is wasted in applications as the user searches for the same group of highly used objects over and over again, day after day.

In one example, the user must select 10 item types from a table that has 2,468 items. For sake of discussion, the table will load six items at a time. The table has a "Next" button that advances to the next sequential set of items, and an entry field with a "Go" button that allows the user to jump to the row number manually entered by the user. In one example, the user moves through the steps to find "item type 1003". To do this, the user types in the number of the row where the data is located, e.g., row 1000 and clicks on "Go" to load the data from that row. The user then selects the desired row and clicks the "Next" button to process the data. After processing, the table will automatically return to the same panel from which the user originated. This process is repeated until the user finds each desired item. However, in this example, the sequence of processing events by the user is quite tedious. But, if the user has to do this very same task every day, the steps become very burdensome.

Accordingly, there exists a need in the art to overcome the deficiencies and limitations described hereinabove.

SUMMARY OF THE INVENTION

In a first aspect of the invention, a method of retrieving items is provided. The method comprises detecting one or more selected items from a list of items; creating placeholders representing each of the detected one or more items in a graphical user interface; and continuously updating the placeholders in the graphical user interface upon detecting of newly selected items in the list of items. The placeholders eliminate the need for subsequent searches for the one or more items in the list.

In another aspect of the invention, a system for retrieving items comprises a computer infrastructure. The computer infrastructure is operable to: create placeholders representing most frequently selected items in a list of items; continuously update the placeholders representing the most frequently selected items in the list of items; and display the placeholders in a graphical user interface. The placeholders are made to eliminate subsequent searches for the most frequently selected items.

In still another aspect of the invention, a computer program product comprises a computer usable medium having readable program code embodied in the medium. The computer program product includes at least one component to provide the processes of the invention.

BRIEF DESCRIPTION OF THE DRAWINGS

The present invention is described in the detailed description which follows, in reference to the noted plurality of drawings by way of non-limiting examples of exemplary embodiments of the present invention, in which.

DETAILED DESCRIPTION OF EMBODIMENTS OF THE INVENTION

The invention generally relates to a method and system to rapidly access frequently used objects and/or items and, more particularly, to a method and system to rapidly access frequently used or searched objects and/or items using placeholders in a graphical user interface. By implementing the system and method of the invention, it is now possible to efficiently search for frequently used objects and/or items (hereinafter referred generally to as items). In accordance with the invention, a graphical user interface (GUI) is designed and structured to include placeholders, e.g., Memory Indicators, for highly useful functions or most frequently used items.

Advantageously, the method and system of the invention can track the specific instances of GUI items (components, objects, etc.) that a specific user works with on a regular basis. That information can be stored in the placeholders and the user can access those specific items instantly by selecting an appropriate placeholder; rather than having to sort or search for the one item amongst hundreds or even thousands or millions of similar items in the system. The placeholders can be continuously updated as the user selects new items.

In embodiments, the invention remembers a predetermined amount of, e.g., 10 top selections, top selections or important items so the user can quickly jump to those items by a simple mouse click. Those of skill in the art should appreciate that the invention could include more or less than 10 top selections or important items, depending on the user configurations. As such, in implementation, the amount of selections can be user configurable such that the user can request more or less than the 10 top selections.

System Environment

Figure 1:
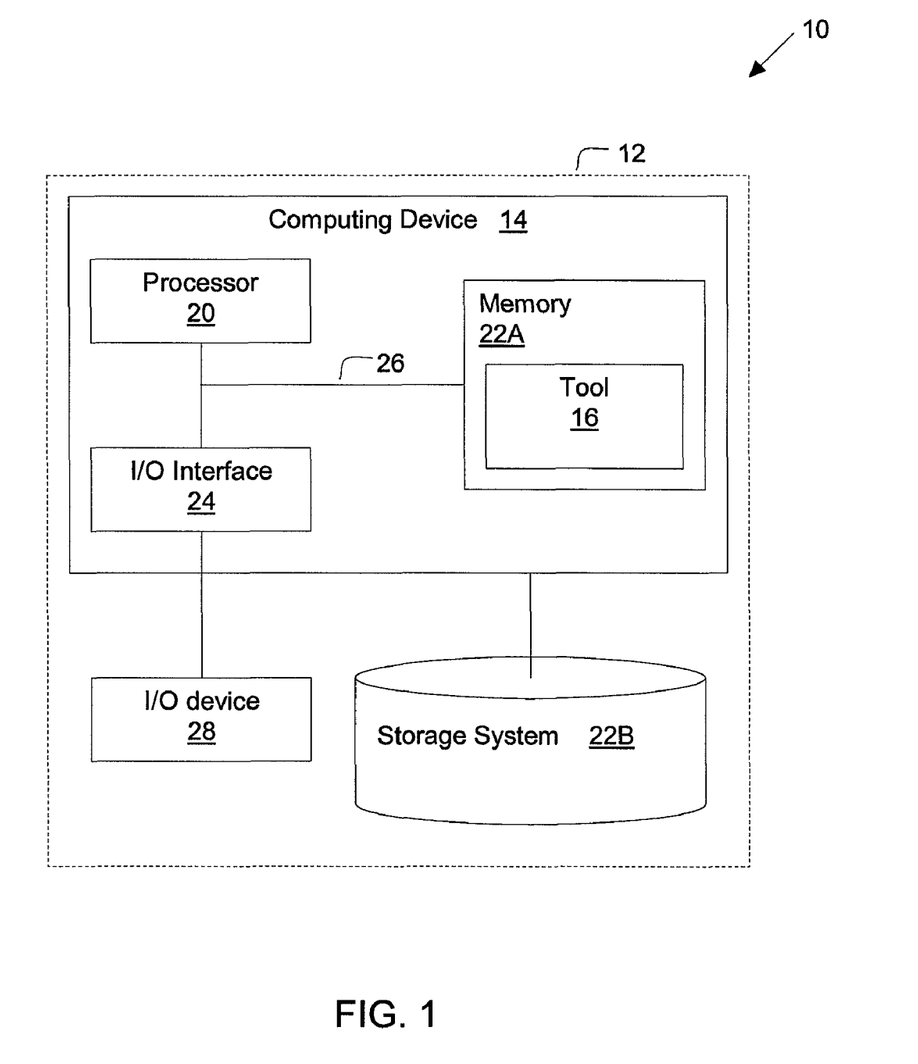
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that is operable to rapidly access frequently used items or important items designated by the user. More specifically, the computing device 14 includes a tool 16 configured to create placeholders, e.g., icons, set of icons or other graphical interfaces (e.g., push button, placeholders, etc.) (hereinafter referred to generally as Memory Indicators) representative of frequently selected items. By providing such Memory Indicators it is possible to easily and efficiently select most frequently used items, most important items or last accessed items, etc, from a list of items. The Memory Indicators may be persistent in that they are saved across reboots, or they may be saved only across specific sessions, any of which can be configured by the user or set by a service provider.

The computing device 14 includes a processor 20, a memory 22A, an input/output (I/O) interface 24, and a bus 26. Further, the computing device 14 is in communication with an external I/O device/resource 28 and a storage system 22B. In embodiments, the tool 16 is stored in the memory 22A to provide the functionality and processes described herein. For example, the tool 16 is configured to monitor user actions, determine most frequently selected items and provide Memory Indicators of the most frequently selected items. The tool 16 is also configured to provide "fly over" text when a cursor is dragged over the Memory Indicator. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link. For example, the I/O device 28 can be a computer screen showing the Memory Indicators. The Memory Indicators may be saved in storage 22B, whether they are persistent across reboots, or across specific sessions.

The processor 20 executes computer program, which is stored in memory 22A and/or storage system 22B. The computer program code can be implemented in the tool 16. While executing computer program code, the processor 20 can read and/or write data to/from memory 22A, storage system 22B, and/or I/O interface 24. The computer program code includes the processes of the invention as discussed herein.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a Client/Server) that communicate over any type of communications link, such as a network, a shared memory, or the like, to perform the process described herein. The communications link can comprise any combination of wired and/or wireless links; any combination of one or more types of networks (e.g., the Internet, a wide area network, a local area network, a virtual private network, etc.); and/or utilize any combination of transmission techniques and protocols.

A service provider can create, maintain, deploy and support the infrastructure such as that described in FIG. 1. The service provider, such as a Solution Integrator, advertiser, etc., could offer to perform the processes described herein for payment from the customer(s) under a subscription and/or fee agreement and/or the service provider can receive payment from the sale of advertising content to one or more third parties.

PROCESSES IN ACCORDANCE WITH EMBODIMENTS OF THE INVENTION

Figure 2A:
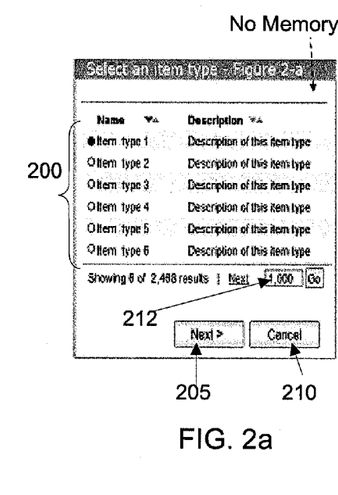
FIGS. 2*a*-2*c* show graphical user interfaces in accordance with the invention.
Figure 2B:
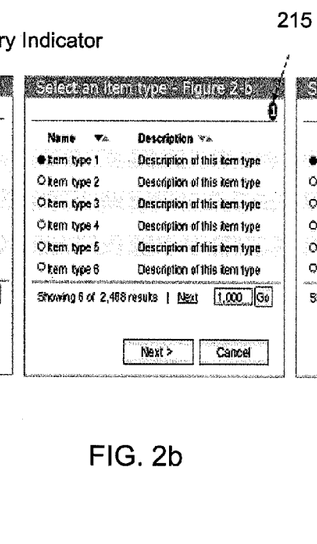
Figure 2C:
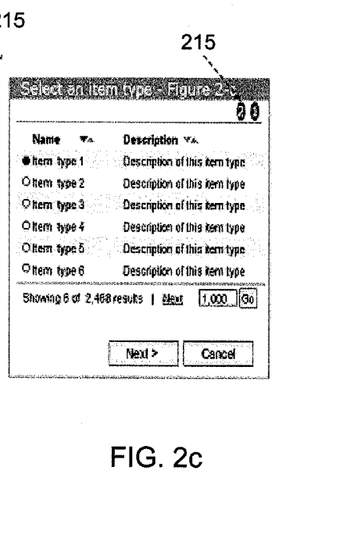

FIGS. 2a-2c show graphical user interfaces in accordance with the invention. More specifically, FIG. 2a shows the graphical user interface prior to the generation of Memory Indicators; whereas, FIGS. 2b and 2c show a graphical user interface with Memory Indicators in accordance with the invention. In FIGS. 2a-2c, the configuration of the graphical user interfaces shows six items of 2458 items. It is contemplated that a different number of items can also be shown; however, for purposes of this discussion, the graphical user interface will be discussed with reference to six items at a time.

Additionally, the graphical user interfaces of FIGS. 2a-2c show a NEXT button 205 and a CANCEL button 210. The NEXT button 205, once selected, will regenerate the graphical user interface to show the following six items and begin the processes of the invention. The CANCEL button 210 will cancel the operations of the invention. The graphical user interfaces of FIGS. 2a-2c also shows a "GO" field and accompanying button, generally depicted at reference numeral 212. In embodiments, instead of progressing sequentially through the items, six at a time, the user can enter a specific number in the "GO" field and select the "GO" button to be automatically directed to that selected number, as should be understood by those of skill in the art.

In accordance with the invention, as the user selects items, the items will be represented as Memory Indicators 215 shown in FIGS. 2b and 2c. For example, in FIG. 2b, a single Memory Indicator 215 is shown at the upper right hand corner of the graphical user interface, representative of a first item selected by the user. In FIG. 2b, two Memory Indicators 215 are shown, which are representative of the two most frequently or recently selected items by the user. The Memory Indicators 215 can be continuously updated as the user selects new items.

As seen in FIG. 2c, the Memory Indicators 215 can be ranked numerically, with the highest number being representative of the most frequently or recently selected item. Of course, those of skill in the art will recognize that other numerical, alphanumerical, symbols or other designations (generally described as indicia) can also be used to designate the rankings of the Memory Indicators. In embodiments, the Memory Indicators 215, upon selection, will automatically direct the user to the respective item. In further embodiments, a description of the item type can be displayed as fly over text automatically as the user passes the cursor over any of the Memory Indicators. Likewise, the system and method contemplates other ways to show the item type such as, for example, tabbing or highlighting across each of the Memory Indicators.

Figure 3:
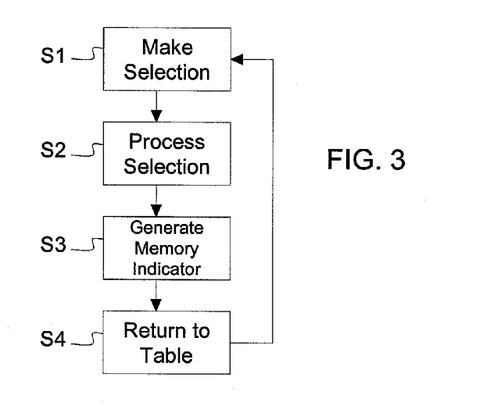
FIG. 3 is a flow diagram implementing processes in accordance with aspects of the invention.

FIG. 3 shows processing steps in accordance with the invention. The processing steps of FIG. 3 may be implemented in the environment of FIG. 1. FIG. 3 may equally represent a high-level block diagram of the invention. The steps of FIG. 3 may be implemented and executed from either a server or in a client server relationship, all representative of FIG. 1, for example. Additionally, the invention can take the form of an entirely hardware embodiment, an entirely software embodiment or an embodiment containing both hardware and software elements. The software embodiment includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In S1, the user selects an item, e.g., item 1 shown in FIG. 2a. At step S2, the tool begins the processing of the data. In embodiments, the user can select the "NEXT" button to begin the processing of data in step S2. In this processing step, the tool processes the data via monitoring and capturing of the user actions. At step S3, the Memory Indicated is generated as shown as memory indicator "1" 215 of FIG. 2b. The Memory Indicator 215 is representative of the one selected item type in the list. At step S4, the user returns to the table (graphical user interface), which now has the Memory Indicator for the selected item. The steps of S1-S4 can be repeated numerous time, each time generating a new Memory Indicator (as represented in FIG. 2c). In this way, the Memory Indicators can be continuously updated with the most frequently selected items. In embodiments, the user can configure the tool to generate a predetermined number of Memory Indicators, e.g., 10 Memory Indicators, or to show the most favorite or important items as Memory Indicators.

In accordance with the invention, several Memory Indicators can be generated and continuously updated by the system and method of the invention. Now that the Memory Indicators are created and established, e.g., by selecting a row, processing it, and then returning to the table, they can constantly be updated by showing the most frequently used item types.

Additional Exemplary Graphical User Interfaces and Processes

Figures 4A, 4B:
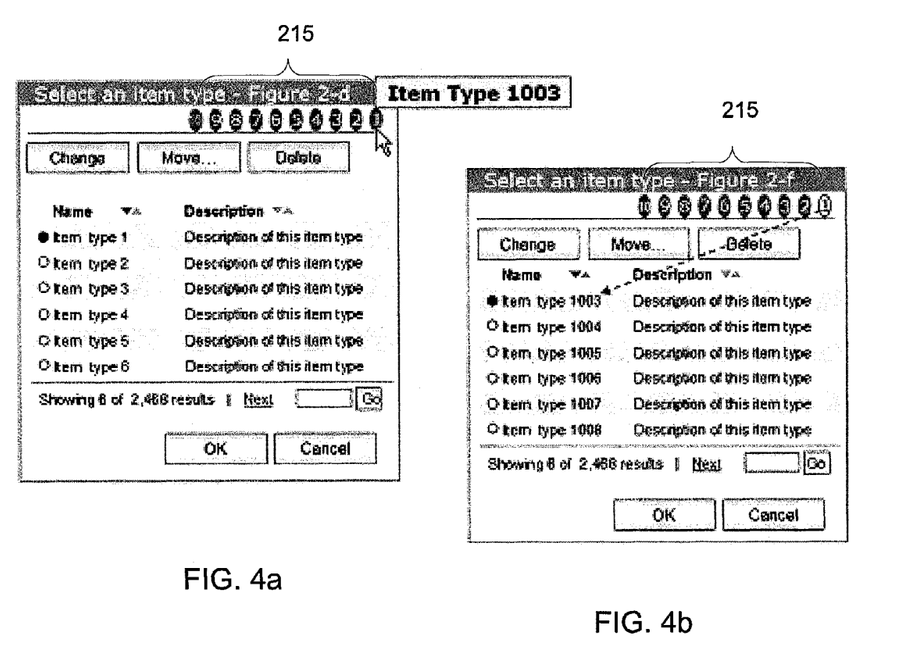
FIGS. 4*a* and 4*b* show exemplary graphical user interfaces with "Memory Indicators" in accordance with the invention.

FIGS. 4a and 4b show exemplary graphical user interfaces with Memory Indicators in accordance with the invention. In FIGS. 4a and 4b, a bank of Memory Indicators is shown at reference numeral 215. The most frequently used item type can be represented by the highest number and the next most frequently used item type can be represented by the next highest number, etc. For example Memory Indicator 10 can be representative of the most frequently used item type, Memory Indicator 9 can be representative of the second most frequently used item type, and so on.

As shown in the exemplary graphical user interface of FIG. 4a, the item type will be displayed as the user moves the cursor over a selected Memory Indicator e.g., fly over text specific to that Memory Indicator. By way of illustration, the user can move the cursor over Memory Indicator "1", at which time the "flyover" text will show item type 1003, This will assist the user in determining which item type to select. As those of skill in the art will appreciate, the user can select any of the Memory Indicators 215, each of which will automatically show the item type.

As shown in FIG. 4b, after the user selects the Memory Indicator, the graphically user interface will automatically regenerate, with the Item type 1003 selected in the table. Also, the selected Memory Indicator, e.g., Memory Indicator "1", can be represented in a different font color, highlight or other distinguishing feature from the remaining Memory Indicators 215. Now, the user only has to select the "OK" button 220 (or other activation icon or command) to begin processing the selected item type, e.g., item type 1003. This eliminates the need to search through a long list of item types in a table, saving the user a considerable amount of time. It should also be understood that the system and method of the invention also lends itself to other controls typically found in GUI widget libraries including, but not limited to drop-down list boxes as well as pushbuttons, any of which can implement the Memory Indicators and, as such, the above example is merely illustrative of one type of use contemplated by the invention.

Search Design Implementations and Processes

FIGS. 5a-5d show a search design in accordance with the invention. In this implementation, the search design includes a fillable value field 500 and fillable search field 505. The value field 500 can be fillable with a customer name, social security number, company name, etc, for example. The search field 505 is preferably a drop down menu allowing the user to select different search options. These options may include, for example, full name, partial name, company, etc. The search design also includes search button 510, using the Memory Indicators of the present invention as, for example, a drop down menu. In the example of FIGS. 5a-5e, the Memory Indicators would store the most frequently used searches. The search design, although used for customer searching in the implementation shown, can be implemented for any search system.

Figure 5A:
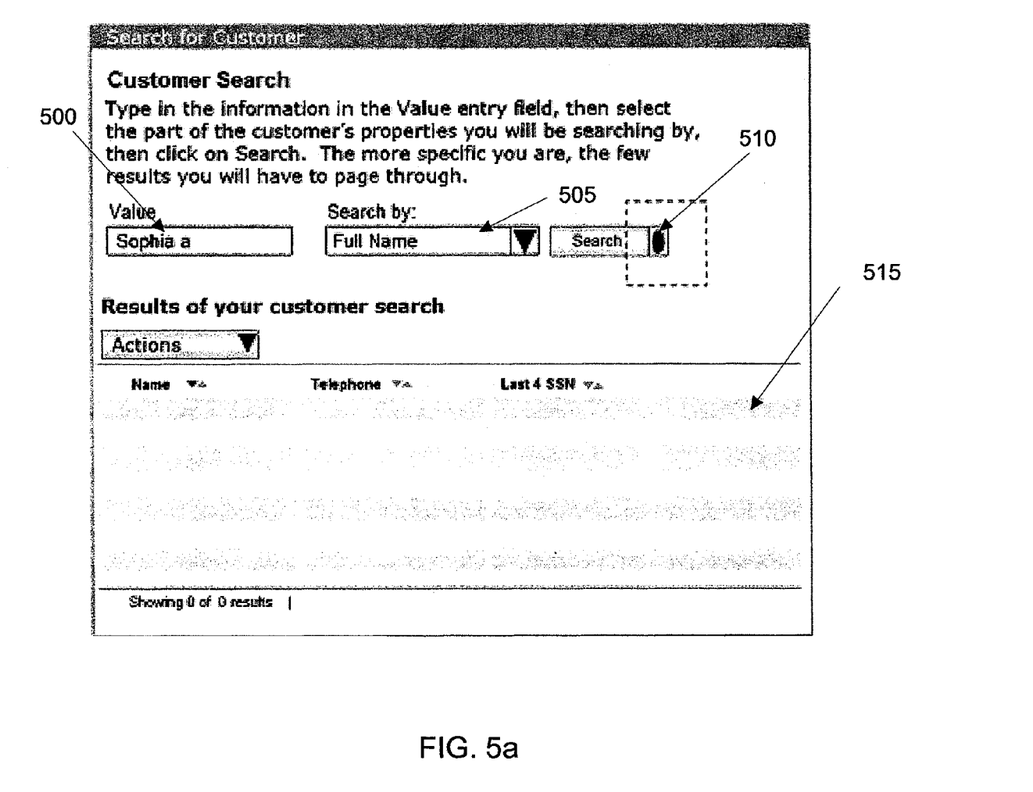
FIGS. 5*a*-5*e* represents exemplary graphical user interfaces and an explanation of processes in accordance with the invention.

In FIG. 5a, the user types in the name or partial name of the customer (or other value) in the value field 500. The user also selects the type of searching (e.g., by full name, last name, social security number, etc) in the search field 505. The user then selects the Search pushbutton 510, which will generate one or more results in the table 515.

Figure 5B:
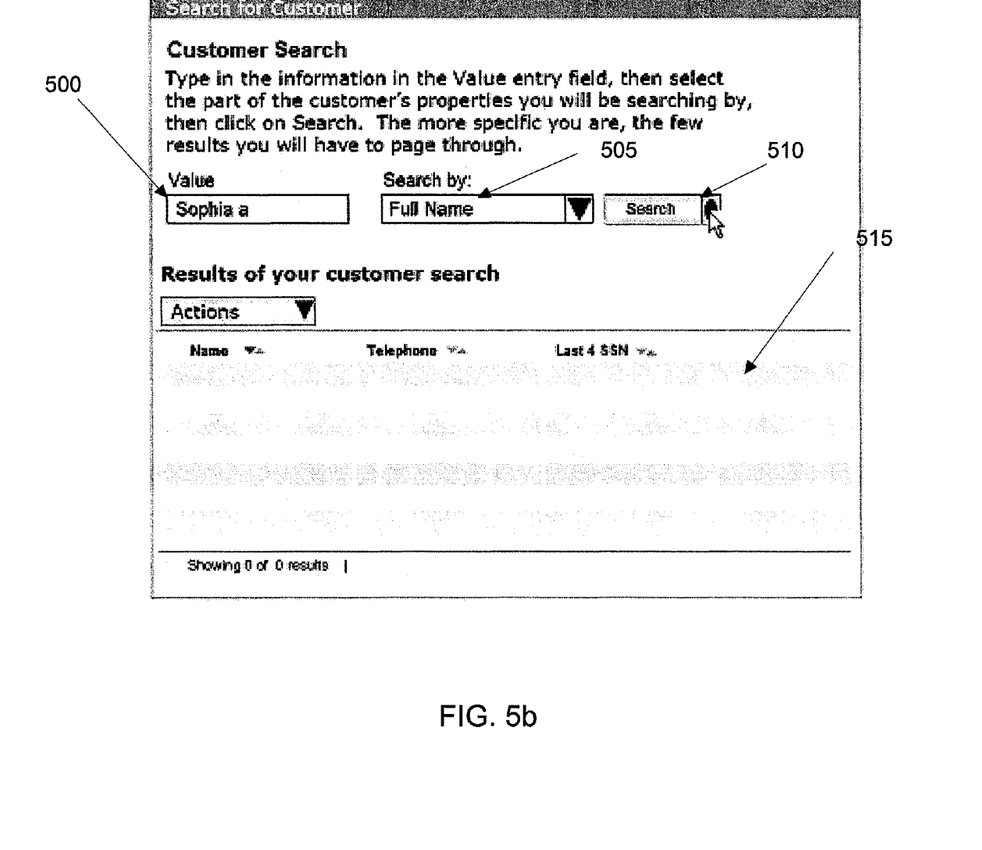
Figure 5C:
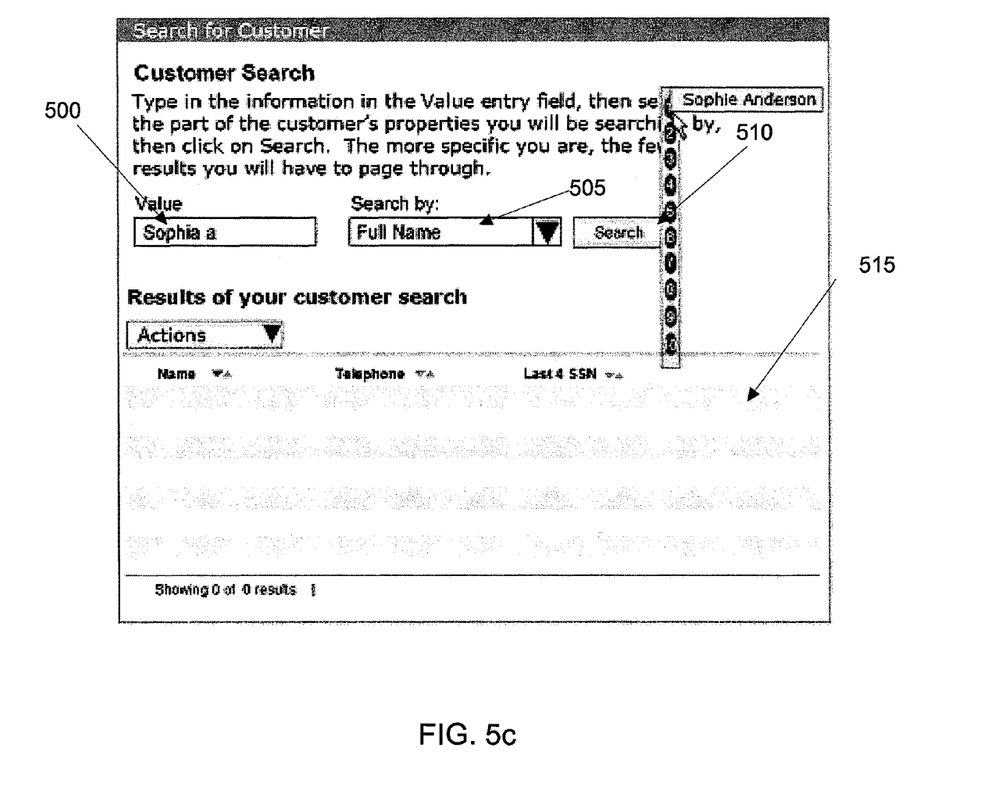

As shown in FIG. 5b, in an alternative method of searching for the customer, the user may simply select the search button 510, which will result in a pull down menu of the Memory Indicators having the most frequently searched customers as shown in FIG. 5c. As in the above embodiments, the tool remembers the most frequently searched customers and stores them in the Memory Indicators. In embodiments, the Memory Indicators can be associated with a specific search term or terms such that the user can fill a field with a search term "X" and a bank of Memory Indicators will be provided associated with the search term "X". In this way, a bank of Memory Indicators can be unique to different searches.

Figure 5D:
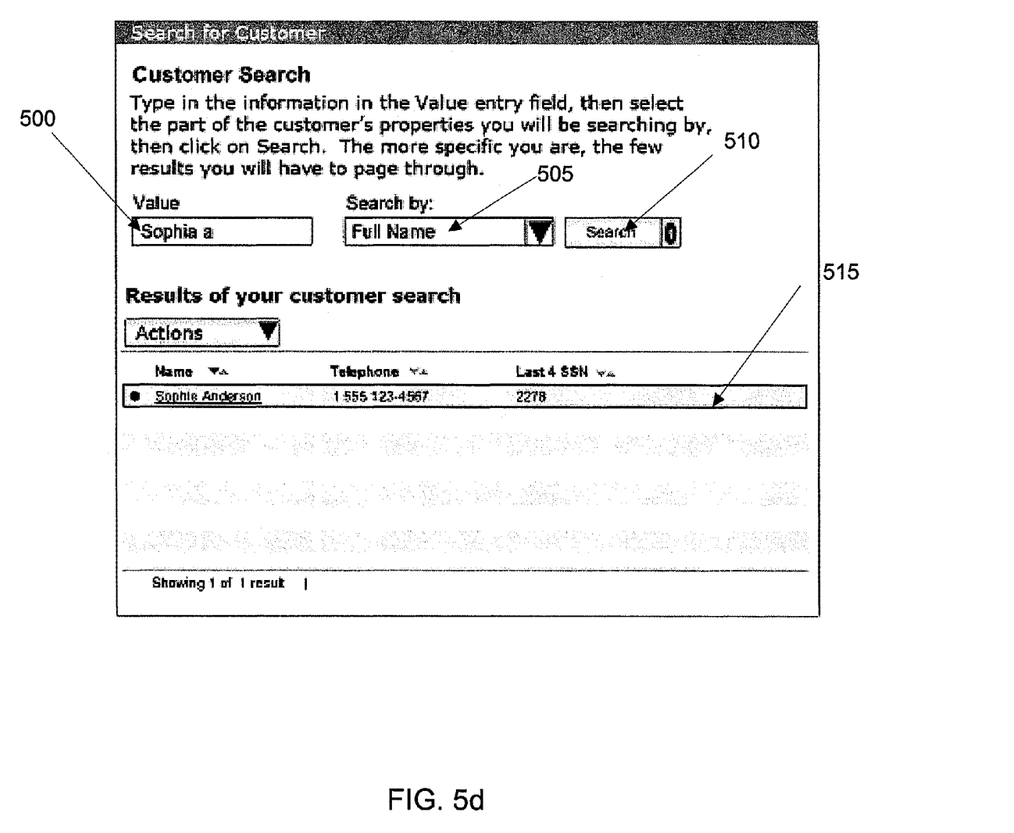

As shown in FIG. 5c, flyover text will appear over each Memory Indicator as the cursor is moved over the respective Memory Indicator. As shown in FIG. 5d, the user can select any of the Memory Indictors, at which time the name, telephone number and social security number are populated in the table 515. In the example of FIG. 5d, the Memory Indicator for Sophie Anderson was selected. Those of skill in the art will realize that the table 515 can be populated with any type of information associated with the selected Memory Indicator.

Figure 5E:
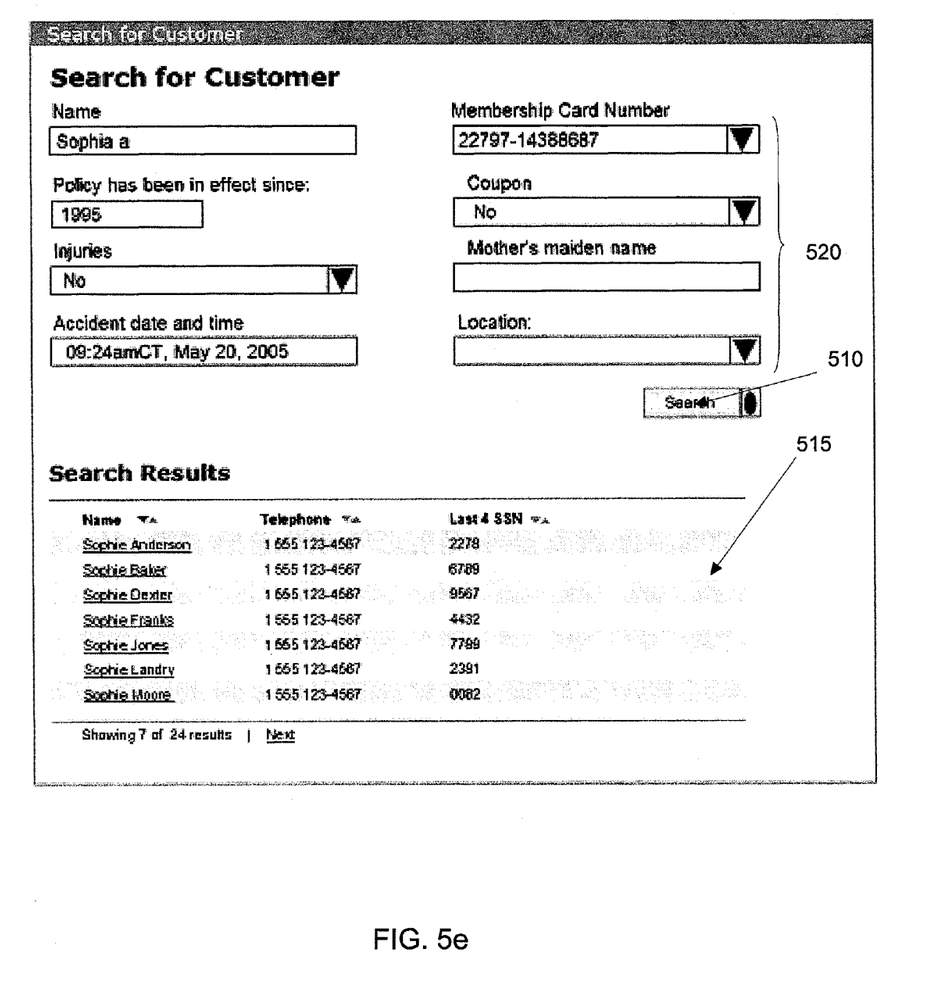

FIG. 5e shows another implementation of the invention. In FIG. 5e, different fields are shown, all of which are represented generically as reference numeral 520. These fields include, for example, a name field, a policy effect day field, an injury field, an accident date field, a membership card field, a coupon field, a mother's maiden name field and a location field. The graphical user interface also includes the search button 510 with Memory Indicators and the table 515. The table 515 is populated with information. In this implementation, it has been found that when the search functions require more than one or two arguments to find a specific GUI item, then the utility of the Memory Indicator function becomes even more important in that the Memory Indicator allows for a more efficient search in accordance with the invention. That is, it may not be necessary for the user to fill in all of the fields, such as the mother's maiden name and the location, to name two specific examples.

While the invention has been described in terms of embodiments, those skilled in the art will recognize that the invention can be practiced with modifications and in the spirit and scope of the appended claims.

What is claimed is:

1. A method of retrieving items, comprising:
   detecting one or more selected items from a list of items;
   creating placeholders representing each of the detected one or more items in a graphical user interface, the placeholders eliminating a need for subsequent searches for the one or more items in the list;
   continuously updating the placeholders in the graphical user interface upon detecting of newly selected items in the list of items; and
   displaying indicia with each of the placeholders in the graphical user interface, each of the indicia designating an importance of a respective placeholder of the placeholders based on how frequently or recently an item of the respective placeholder is selected,
   wherein the continuously updating of the placeholders comprises creating and displaying additional placeholders representing most frequently selected or searched items, the additional placeholders created and displayed in the graphical user interface, in addition to the placeholders, and along with the placeholders.

2. The method of claim 1, wherein the placeholders are graphical components.

3. The method of claim 2, wherein the graphical components are icons.

4. The method of claim 1, further comprising displaying a preselected number of the placeholders in the graphical user interface.

5. The method of claim 1, further comprising providing fly over text for each of the placeholders, the fly over text including descriptive information of an item type associated with the one or more items.

6. The method of claim 1, wherein the placeholders are representative of most frequently selected items or of last accessed items.

7. The method of claim 1, further comprising direct selection to any of the one or more items by selecting the respective placeholder of the placeholders.

8. The method of claim 1, wherein each of the indicia designate a ranking associated with the respective placeholder of the placeholders based on how frequently or recently the item of the respective placeholder is selected.

9. The method of claim 8, wherein each of the indicia comprise at least one of a numerical designation, an alphanumerical designation, and a symbol to designate the importance of the respective placeholder.

10. The method of claim 9, further comprising when one of the placeholders is selected, display the selected one of the placeholders in at least one of a different font color and highlight.

11. The method of claim 1, further comprising monitoring user actions, determining from the user actions most frequently used of the one or more items and creating the placeholders for the most frequently used of the one or more items.

12. The method of claim 1, further comprising providing a computer infrastructure implementing the steps of claim 1 and which is at least one of created, deployed, maintained and supported by service provider.

13. The method of claim 1, further comprising directing a user to the one or more items by a selection of the placeholders.

14. A system for retrieving items, comprising:
   a computer infrastructure being operable to:
      create placeholders representing most frequently selected items in a list of items;
      continuously update the placeholders representing the most frequently selected items in the list of items, the placeholders being configured to eliminate subsequent searches for the most frequently selected items;
      display the placeholders in a graphical user interface; and
      display indicia with each of the placeholders in the graphical user interface, each of the indicia designating an importance of a respective placeholder of the placeholders based on how frequently or recently an item of the respective placeholder is selected,
   wherein the continuously updating of the placeholders comprises creating and displaying additional placeholders representing the most frequently selected items, the additional placeholders created and displayed in the graphical user interface, in addition to the placeholders, and along with the placeholders.

15. The system of claim 14, wherein the computer infrastructure is operable to display descriptive fly over text describing associated with the placeholders.

16. The system of claim 14, wherein the computer infrastructure is operable to display the placeholders as icons.

17. The system of claim 14, wherein the computer infrastructure is operable to save the placeholders across reboots or for a particular session.

18. The system of claim 14, wherein the computer infrastructure is operable to access any of the most frequently selected items by selecting the respective placeholder of the placeholders.

19. The system of claim 14, wherein each of the indicia designate a ranking associated with the respective placeholder of the placeholders based on how frequently or recently the item of the respective placeholder is selected.

20. The system of claim 19, wherein each of the indicia comprise at least one of a numerical designation, an alphanumerical designation, and a symbol to designate the importance of the respective placeholder.

21. The system of claim 20, wherein the computer infrastructure is further operable to when one of the placeholders is selected, display the selected one of the placeholders in at least one of a different font color and highlight.

22. The system of claim 14, wherein the computer infrastructure is operable to monitor user actions, determine from the user actions most the frequently used items and create the placeholders for the most frequently used items.

23. The system of claim 14, wherein the computer infrastructure is created, maintained, deployed and supported by a service provider.

24. A computer program product comprising a computer usable storage medium having readable program code embodied in the storage medium, the computer program product includes at least one component operable to:

create placeholders representing most frequently selected or searched items;

continuously update the placeholders representing the most frequently selected or searched items;

display the placeholders as a graphical representation in a graphical user interface; and display indicia with each of the placeholders in the graphical user interface, each of the indicia designating an importance of a respective placeholder of the placeholders based on how frequently or recently an item of the respective placeholder is selected, wherein the continuously updating of the placeholders comprises creating and displaying additional placeholders representing the most frequently selected or searched items, the additional placeholders created and displayed in the graphical user interface, in addition to the placeholders, and along with the placeholders.

25. The computer program product of claim 24, wherein each of the indicia designate a ranking associated with the respective placeholder of the placeholders based on how frequently or recently the item of the respective placeholder is selected.

26. The computer program product of claim 25, wherein each of the indicia comprise at least one of a numerical designation, an alphanumerical designation, and a symbol to designate the importance of the respective placeholder.

27. The computer program product of claim 26, wherein the at least one component is further operable to when one of the placeholders is selected, display the selected one of the placeholders in at least one of a different font color and highlight.

* * * * *